(12) United States Patent
Nicol

(10) Patent No.: US 6,262,179 B1
(45) Date of Patent: *Jul. 17, 2001

(54) PROCESS FOR THE MANUFACTURE OF A COMPOSITION COMPRISING A VINYLAROMATIC POLYMER AND A RUBBER BY POLYMERIZATION IN THE PRESENCE OF A STABLE FREE RADICAL

(75) Inventor: Pascal Nicol, Pau (FR)

(73) Assignee: ATOFINA (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 28 days.

(21) Appl. No.: 08/597,231

(22) Filed: Feb. 6, 1996

(30) Foreign Application Priority Data

Feb. 7, 1995 (FR) .................................................. 95 01380

(51) Int. Cl.$^7$ .......................... C08F 255/00; C08F 255/08
(52) U.S. Cl. ........................... 525/192; 525/194; 525/316
(58) Field of Search .................................. 525/192, 194, 525/316

(56) References Cited

U.S. PATENT DOCUMENTS

| | | |
|---|---|---|
| 2,768,156 | 10/1956 | Brederick et al. . |
| 3,880,822 | 4/1975 | Perrotti ................................. 525/340 |
| 4,070,419 | 1/1978 | Watson ................................. 525/244 |
| 4,123,148 | 10/1978 | Gilg et al. . |
| 4,493,922 | 1/1985 | Adolf et al. . |
| 4,581,429 | 4/1986 | Solomon .............................. 526/220 |
| 4,672,088 | 6/1987 | Scott et al. . |
| 5,017,458 | 5/1991 | Soda et al. . |
| 5,087,752 | 2/1992 | Murray et al. . |
| 5,185,448 | 2/1993 | Odorisio et al. . |
| 5,312,871 | * 5/1994 | Mardare et al. ..................... 525/272 |
| 5,322,912 | * 6/1994 | Georges et al. ..................... 526/204 |
| 5,401,804 | * 3/1995 | Georges et al. ..................... 525/267 |
| 5,412,047 | 5/1995 | Georges et al. . |
| 5,449,724 | 9/1995 | Moffat et al. . |
| 5,498,679 | * 3/1996 | Moffat et al. ....................... 526/190 |
| 5,616,638 | * 4/1997 | Hallden-Abberton et al. ...... 524/178 |
| 5,721,320 | * 2/1998 | Priddy et al. ....................... 525/316 |
| 5,763,548 | * 6/1998 | Matyjaszewski et al. ........... 526/135 |
| 5,773,510 | * 6/1998 | Kazmaier et al. ................... 525/26 |
| 5,919,871 | * 7/1999 | Nicol et al. ....................... 525/333.8 |

FOREIGN PATENT DOCUMENTS

| | | |
|---|---|---|
| 2 061 037 | 8/1992 | (CA) . |
| 294 493 | 10/1991 | (DD) . |
| 3 917 437 | 11/1989 | (DE) . |
| 035 291 | 9/1981 | (EP) . |
| 0 135 280 | 3/1985 | (EP) . |
| 0 157 738 | 10/1985 | (EP) . |
| 0 418 042 | 3/1991 | (EP) . |
| 0 488 403 | 6/1992 | (EP) . |
| 0 499 581 | 8/1992 | (EP) . |
| 0 512 951 | 11/1992 | (EP) . |
| 0 641 822 | 3/1995 | (EP) . |
| 1199351 | 7/1970 | (GB) . |

OTHER PUBLICATIONS

Encyclopedia Of Polymer Science and Engineering, J. Wiley and Sons, New York, vol. 16, pp. 21–28 and 88–89, 1989.*
G. Odian, Principles of Polymerization, J. Wiley and Sons, New York, pp. 679–680, 1981.*
R.W. Murray and M. Singh, Tetrahedron Letters, 1988, 29 (37), pp. 4677–4680.
J. Am. Chem. Soc., 1967, 89(12), pp. 3055–3056.
P. Tordo et al. "Phosphorus–Substituted Nitroxides. 3.$^4$ Hyperconjugative ability of Carbon–Phosphorus bonds in Five–Membered Ring Nitroxides", J. of Phys. Chem., vol. 82, No. 15, pp 1742–1744, 1978.
V. Reznikov et al. "Stable Nitroxides With Hydrogen At $\alpha$–carbon of the Nitroxyl Group", Tetrahedron Letters, vol. 35, No. 14, pp 2239–2240, 1994.
M. Skorobogatova et al., "Synthesis of $\alpha,\alpha'$–Bisdialkylphosphonoisopropylnitroxyls", English Translation of Izv. Akad. Nauk SSSR, Ser. Khim. (1979), (8), 1867–8.
Echte, Rubber–toughened styrene polymers, ed. C. Keith Riew, Advances in Chemistry Series 222, American Chemical Society Washington, DC 1989 (first 8 pages of article).
E. I. Kirillova, et al., "Stabilization of High Impact Polystyrene", translated from Zhurnal Prikhadnoi Khimii, vol. 52, No. 9, 2061–2065 (Sep. 1979).
U.S. application No. 08/597,232 (no copy provided).
U.S. application No. 08/687,543 (no copy provided).

* cited by examiner

Primary Examiner—Jeffrey C. Mullis
(74) Attorney, Agent, or Firm—Pennie & Edmonds LLP

(57) ABSTRACT

The present invention relates to a process for the manufacture of a composition comprising a vinylaromatic polymer and a rubber, wherein the polymerization stage is carried out in the presence of a stable free radical in a polymerization mixture. The presence of the stable free radical in the polymerization mixture makes its possible to increase the melt index and to influence the size of the rubber nodules in the final composition by generally increasing the fraction, by volume, of the rubbery phase and by widening the distribution of the size of these nodules. This is reflected by an improvement both in the melt index and in the impact strength of the final composition, which makes the latter an ideal composition for injection molding.

21 Claims, 3 Drawing Sheets

PROCESS FOR THE MANUFACTURE OF A COMPOSITION COMPRISING A VINYLAROMATIC POLYMER AND A RUBBER BY POLYMERIZATION IN THE PRESENCE OF A STABLE FREE RADICAL

FIELD OF INVENTION

The present invention relates to a process for the manufacture of a composition comprising a vinylaromatic polymer and a rubber.

BACKGROUND OF THE INVENTION

Compositions comprising a vinylaromatic polymer and a rubber must exhibit a set of properties such as good impact resistance, a gloss suited to the desired application and a melt index suited to the conversion technique envisaged.

It is useful to be able to have available means which make it possible to influence these various properties so as to control them better and to make them more suitable for the targeted application.

It is known that compositions comprising a rubber in the form of nodules are generally more resistant to impacts when the distribution of the sizes of the rubber nodules is broad, indeed bimodal. Various processes have been proposed for producing this type of material. Patent EP 48389 teaches that a high-impact polystyrene with the bimodal distribution of nodules can be obtained by independent manufacture of two compositions each containing a specific population of nodules and then by mixing these two compositions. Patent Application EP 418042 teaches that such a composition can be obtained using a single polymerization reactor, by virtue of the use of a polybutadiene exhibiting a bimodal molecular mass distribution.

Patent Application WO 94/11412 teaches that polystyrene with a polydispersity of less than 2 and with a weight-average molecular mass of less than 80,000 can be obtained when the polymerization of styrene is carried out in the presence of a stable free radical and of a polymerization initiator and in the absence of rubber, the molar ratio of the stable free radical to the polymerization initiator being between 0.4 and 2.5, which corresponds to a concentration of stable free radical initiator which is markedly greater than 0.1% by weight in the polymerization mixture and more generally in the region of 1% by weight in the polymerization mixture.

SUMMARY OF THE INVENTION

The present invention relates to a process for the manufacture of a composition comprising a vinylaromatic polymer and a rubber, characterized in that the polymerization stage is carried out in the presence of a stable free radical.

The presence of a stable free radical in the polymerization mixture, even in a very small amount, of less than 0.1% by weight, makes it possible to markedly influence the size of the rubber nodules in the final composition by generally increasing the mean size of the latter and by widening the distribution of the size of these nodules. Compositions exhibiting markedly bimodal nodule size distributions can even be obtained.

BRIEF DESCRIPTION OF THE DRAWINGS

Also.

DETAIL DESCRIPTION OF THE INVENTION

Figure 1:
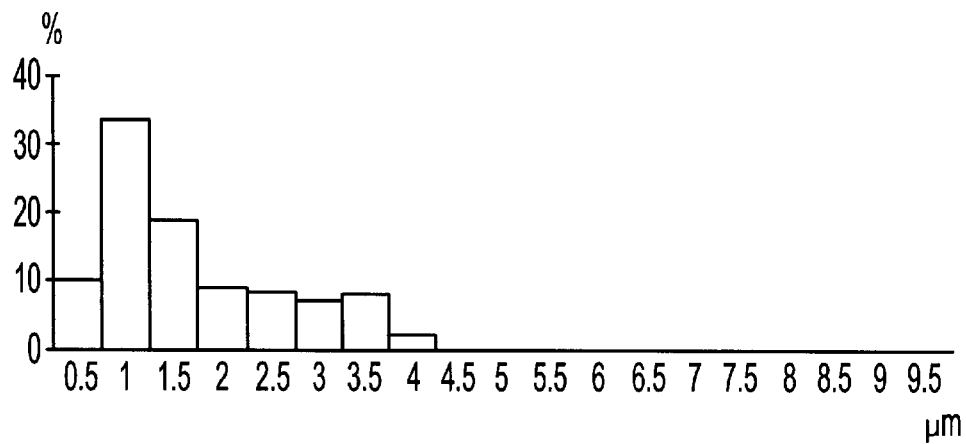
FIG. 1 shows distribution of sizes of nodules in the composition of Example 1 (comparative) by expressed as % volume of nodules as a function of the diameter of the nodules.

A stable free radical must not be confused with the free radicals whose lifetime is fleeting (a few milliseconds), such as the free radicals resulting from the usual polymerization initiators, such as peroxides, hydroperoxides and initiators of azo type. The free radicals which are polymerization initiators have a tendency to accelerate polymerization. In contrast, the stable free radicals generally have a tendency to slow down polymerization. It may generally be said that a free radical is stable within the meaning of the present invention if it is not a polymerization initiator and if, under the conditions of use of the present invention, the mean lifetime of the radical is at least five minutes. During this mean lifetime, the molecules of the stable free radical continuously alternate between the radical state and the state of a group bonded via a covalent bond to a polymer chain. Of course, it is preferable for the stable free radical to exhibit good stability throughout the duration of its use within the context of the present invention. Generally, a stable free radical can be isolated in the radical state at room temperature.

The family of the stable free radicals includes compounds which act as radical polymerization inhibitors, the stable nitroxide radicals, that is to say comprising the =N—O. group, such as the radicals represented by the following formulae:

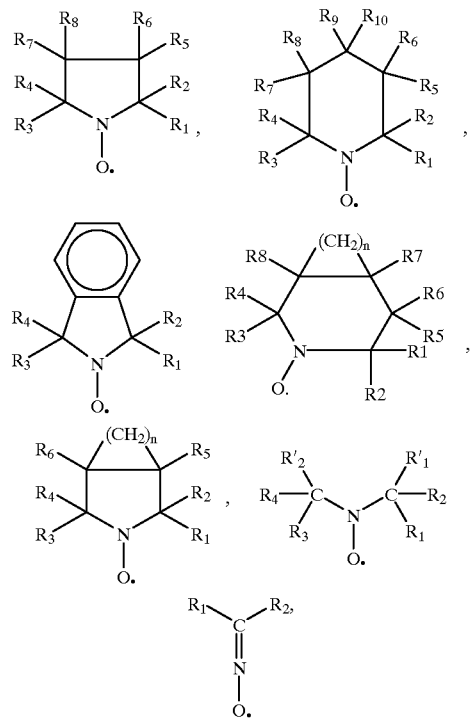

in which $R_1$, $R_2$, $R_3$, $R_4$, $R'_1$ and $R'_2$, which can be identical or different, represent a halogen atom, such as chlorine, bromine or iodine, a saturated or unsaturated, linear, branched or cyclic hydrocarbon group, such as an alkyl or phenyl radical, or an ester group —COOR or an alkoxy group —OR, or a phosphonate group —PO(OR)$_2$, or a polymer chain which can be, for example, a poly(methyl methacrylate) chain, a polybutadiene chain, a polyolefin chain, such as a polyethylene or polypropylene chain, but which is preferably a polystyrene chain, and in which $R_5$, $R_6$, $R_7$, $R_8$, $R_9$ and $R_{10}$, which can be identical or different, can be chosen from the same family of groups as that which has just been envisaged for $R_1$, $R_2$, $R_3$, $R_4$, $R'_1$ and $R'_2$, and can furthermore represent a hydrogen atom, a hydroxyl group —OH or an acid group such as —COOH or —PO(OH)$_2$ or —SO$_3$H.

In particular, the stable free radical can be 2,2,5,5-tetramethyl-1-pyrrolidinyloxy, marketed under the tradename Proxyl, or 2,2,6,6-tetramethyl-1-piperidinyloxy, generally marketed under the name Tempo.

Of course, it would not be departing from the context of the present invention to introduce, in place of the stable free radical, an initiator or generator of a stable free radical under the conditions of polymerization, that is to say, for example, a product which would not be a stable free radical at room temperature but which would be a source of a stable free radical as soon as the mixture intended to be polymerized would begin to be heated. Such compounds, containing =N—O—X groups, have been described in U.S. Pat. No. 4,581,429. Such compounds generate, by heating at the usual polymerization temperatures, stable free radicals containing an =N—O. group.

The stable free radical is preferably present in the polymerization mixture in the proportion of 1 to 1000 ppm and more preferably in the proportion of 10 to 250 ppm, with respect to the total amount of vinylaromatic monomer. In the range 1 to 1000 ppm, when the concentration of stable free radical is increased, the distribution of the sizes of the nodules tends to widen and to change from monomodal to bimodal, and the fraction, by volume, of rubbery phase in the final composition tends to increase. A distribution is said to be bimodal when its curve representing the amount of nodule as a function of their diameter exhibits two maxima. In the range 1 to 1000 ppm, when the concentration of stable free radical is increased, the impact strength of the material generally passes through a maximum and the melt index of the final composition tends to increase. This behaviour is noteworthy because, according to the prior art, these two properties, impact strength and fluidity, generally develop in opposite directions. This characteristic makes the composition obtained by the process according to the invention an ideal composition for injection moulding processes intended for the production of components which have to possess good impact strength. The amount of stable free radical for which the distribution changes from monomodal to bimodal, or for which the impact strength of the material is maximum or for which the best set of properties, impact strength and fluidity, taking into account the application envisaged, is obtained, can depend on the nature and on the amount of the ingredients present in the polymerization and on the polymerization conditions. By virtue of the present invention, for given polymerization conditions, the person skilled in the art can find, by routine tests, the concentration of stable free radical at which the distribution becomes bimodal and the concentration of stable free radical at which the impact strength of the material and its fluidity are optimum.

Except for the presence of the stable free radical, the other ingredients used, and the conditions of synthesis, are those commonly used for the manufacture of compositions comprising a vinylaromatic polymer and a rubber.

The process according to the invention, which can operate continuously or in batch mode, involves a polymerization stage in which the mixture comprises at least one vinylaromatic monomer, at least one rubber, at least one stable free radical and, if appropriate, at least one solvent.

By way of example, the mixture intended to be polymerized can comprise:

per 100 parts by weight of vinylaromatic monomer, 2 to 35 parts by weight of rubber, and 0 to 15 parts by weight of solvent.

Vinylaromatic monomer is understood to mean styrene, styrene substituted on the vinyl group by an alkyl group, such as alpha-methylstyrene or alpha-ethylstyrene, styrene substituted on the ring by an alkyl group, such as ortho-vinyltoluene, para-vinyltoluene, ortho-ethylstyrene or 2,4-dimethylstyrene, styrene substituted on the ring by a halogen, such as for example 2,4-dichlorostyrene, styrene substituted both by halogen and an alkyl group, such as 2-chloro-4-methylstyrene, and vinylanthracene. Styrene is a preferred vinylaromatic monomer.

The polymerization mixture can furthermore contain at least one monomer which is copolymerizable with the vinylaromatic monomer(s), such as, for example, at least one acrylic or methacrylic monomer.

Rubber is understood to mean those commonly used to improve the impact properties of vinylaromatic polymers. These are usually conjugated polydienes such as polybutadiene, polyisoprene or styrene-butadiene copolymers of elastomer type also known as "SBR" ("styrene-butadiene rubber") rubber.

The polymerization mixture can also contain at least one organic solvent. The latter is chosen so that it does not boil under the polymerization conditions and so that it is miscible with the vinylaromatic monomer and the vinylaromatic polymer which derives therefrom. Use may be made of alicyclic hydrocarbons such as cyclohexane or, preferably, aromatic hydrocarbons such as toluene, benzene, ethylbenzene or xylene.

At least one polymerization adjuvant or initiator usual in this type of preparation can be added to the polymerization mixture, before or during polymerization. These adjuvants can be plasticizers, such as mineral oils, butyl stearate or dioctyl phthalate, or stabilizers, such as antioxidants which can be phenol substituted by an alkyl group, such as di-tert-butyl-para-cresol, or phosphites, such as trinonylphenyl phosphite.

If a plasticizer is introduced, the latter can be introduced in an amount such that it is present in the proportion of 0 to 6% by weight in the composition finally synthesized.

If a stabilizer is introduced, the latter can be present in the polymerization mixture in the proportion of 0 to 3000 ppm.

The polymerization reaction can be thermally initiated, without either a polymerization initiator or a catalyst, or can be initiated by a polymerization initiator. If the polymerization is thermally initiated, it can be carried out between 100 and 200° C. and preferably between 110 and 160° C.

If the polymerization is initiated by a polymerization initiator, it can be carried out between 50 and 200° C. and preferably between 90 and 160° C. The polymerization initiator can be chosen from organic peroxides and hydroperoxides, such as dibenzoyl peroxide, tert-butyl peroxybenzoate or 1,1-bis(tert-butylperoxy)cyclohexane, or azo compounds, such as azobisisobutyronitrile.

The polymerization initiator can be present in the proportion of 50 to 2000 ppm on the basis of the vinylaromatic monomer or monomers introduced.

During polymerization, the well-known phenomenon of phase inversion takes place, resulting in the formation of rubber nodules dispersed in a matrix of vinylaromatic polymer or copolymer. During this polymerization, stirring must be sufficient for the dispersion of the rubber nodules to be uniform.

After polymerization, it is advisable to remove the volatile species, such as unreacted monomers and optional organic solvent. This can be carried out by conventional techniques such as by the use of a devolatilizer operating while hot and under vacuum.

The final rubber and vinylaromatic polymer or copolymer content of the composition according to the invention depends on the degree of progression of the polymerization carried out before removal of the volatile species. In fact, if the degree of progression of the polymerization is low, removal of the volatile species will result in the removal of a large amount of vinylaromatic monomer and the final rubber content of the composition will be higher. In order not to produce excessively high crosslinking of the rubber, it is preferable not to continue the polymerization to 100% of the vinylaromatic monomers.

The progression of the polymerization can be monitored by virtue of withdrawals made during the polymerization stage and by determination of the level of solid in the samples withdrawn. Level of solid is understood to mean the percentage by weight of solid obtained after evaporation under a vacuum of 25 millibars for approximately 20 minutes at 200° C. of the samples withdrawn with respect to the initial weight of the sample withdrawn. The polymerization can be continued, for example until a level of solid of between 60 and 80% by weight is obtained.

It is preferable to adjust the amounts of ingredients introduced and the manufacturing conditions so that the final composition contains between 2 and 25% and more preferably between 4 and 15% of rubber.

In the following examples, the structure and the properties of the compositions obtained were determined by the following techniques:

Izod impact strength on an unnotched bar: 179/1D standard, molecular mass of the polystyrene: the polystyrene is extracted from the high-impact polystyrene with methyl ethyl ketone and its molecular mass is measured by gel permeation chromatography (GPC). In Table 1, Mw represents the weight-average molecular mass of the polystyrene, Mn represents the number-average molecular mass of the polystyrene and Mw/Mn represents the ratio of the weight-average molecular mass to the number-average molecular mass of the polystyrene, level of polybutadiene in the compositions: NF standard T 51-007, melt index: ISO standard 1133, mean size of the rubber nodules and distribution of the sizes of the nodules: sedimentary particle size determination (capa 700), after dissolving in methyl ethyl ketone.

In Table 1, "mono" means that the distribution of the sizes of the nodules is monomodal. In Table 1, "bi" means that the distribution of the sizes of the nodules is bimodal.

EXAMPLE 1

Comparative 7360 g of styrene, 160 g of a plasticizing oil of Primol 352 trademark marketed by the company Esso, 8 g of an antioxidant of Irganox 1076 trademark marketed by the company Ciba and 480 g of a polybutadiene of BR 1202 G trademark marketed by the company Shell, the last product exhibiting a weight-average molecular mass of 287,000 and a viscosity at 25° C. at 5% by weight in styrene of 160 centipoises, are introduced at room temperature into a 15-liter stainless steel reactor equipped with a stirrer system and a temperature control.

After the polybutadiene has completely dissolved, the solution is thermally polymerized, the temperature being raised to 130° C. in 30 min, the reaction mixture then being left for 1 hour and 30 minutes at this temperature, the temperature then being raised from 130 to 150° C. in 15 minutes and the reaction mixture being left for 55 minutes at 150° C. The contents of the reactor are then transferred into a devolatilizer at 210° C. under a vacuum of 25 millibars for approximately 10 minutes. The properties of the composition thus obtained are shown in Table 1. The distribution of the sizes of the nodules is represented in FIG. 1, expressed as % by volume of nodules as a function of the diameter of these nodules.

EXAMPLE 2

Figure 2:
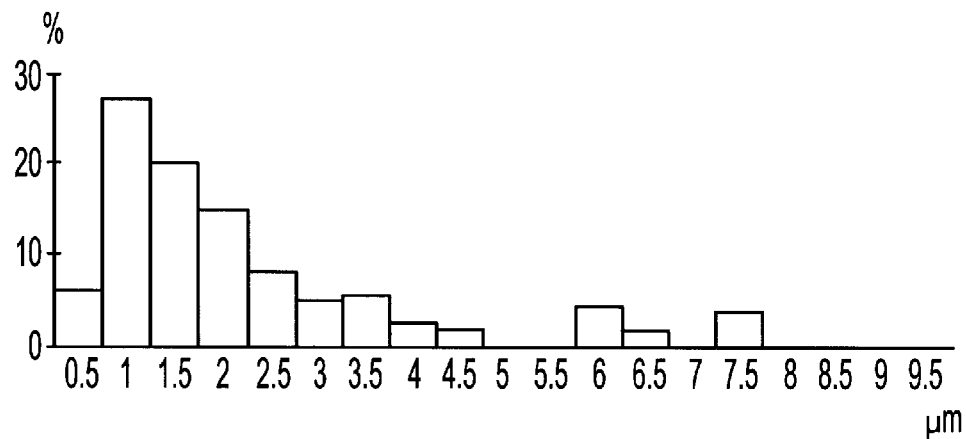
FIGS. 2–7 show distribution of sizes of nodules in the composition of Examples 2–7 by expressed as % volume of nodules as a function of the diameter of the nodules, respectively.

The procedure is as in Example 1, except that 0.8 g of 2,2,6,6-tetramethyl-1-piperidinyloxy (Tempo) is added just before heating. The properties of the composition thus obtained are shown in Table 1. The distribution of the sizes of the nodules (% by volume) is represented in FIG. 2.

EXAMPLE 3

The procedure is as in Example 2, except that 2.4 g of Tempo are introduced in place of the 0.8 g.

Figure 3:
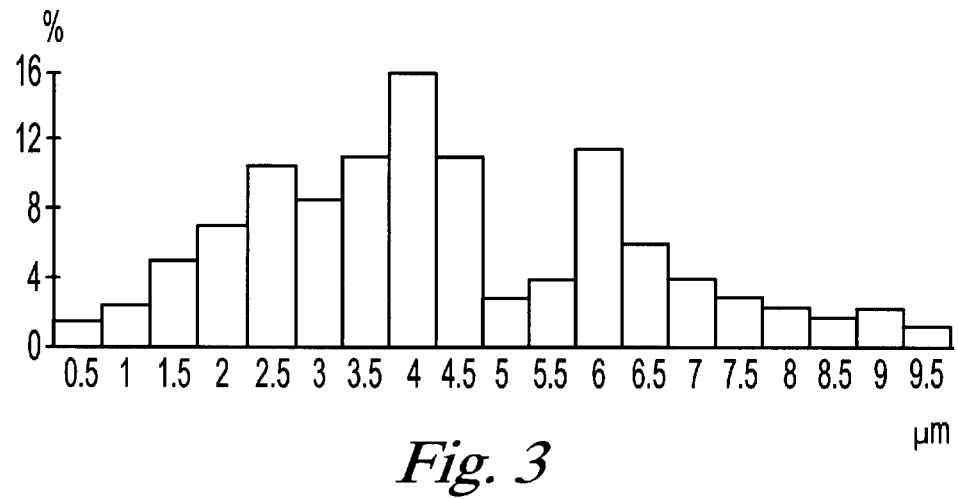

The properties of the composition thus obtained are shown in Table 1. The distribution of the sizes of the nodules (% by volume) is represented in FIG. 3.

EXAMPLE 4

Comparative

The procedure is as in Example 1 but with the following amounts of the ingredients:

| | |
|---|---:|
| styrene: | 7600 g |
| Plasticizing oil Primol 352: | 160 g |
| Antioxidant Irganox 1076: | 8 g |
| Polybutadiene BR 1202 G | 240 g |

Figure 4:
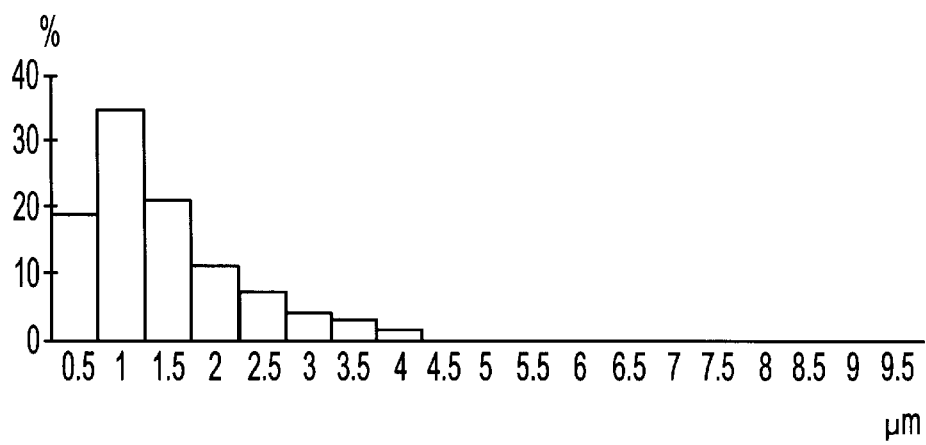

The properties of the composition thus obtained are shown in Table 1. The distribution of the sizes of the nodules (% by volume) is represented in FIG. 4.

EXAMPLE 5

Figure 5:
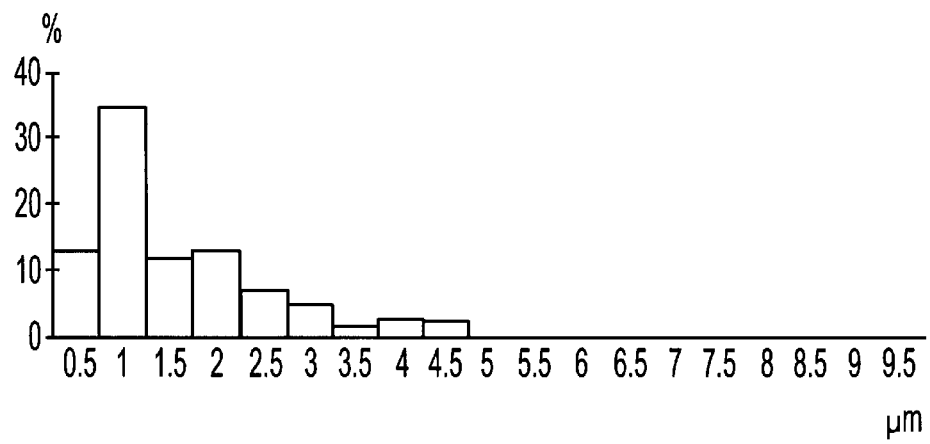

The procedure is as in Example 4, except that 0.4 g of Tempo is introduced just before heating. The properties of the composition thus obtained are shown in Table 1. The distribution of the sizes of the nodules (% by volume) is represented in FIG. 5.

EXAMPLE 6

Figure 6:
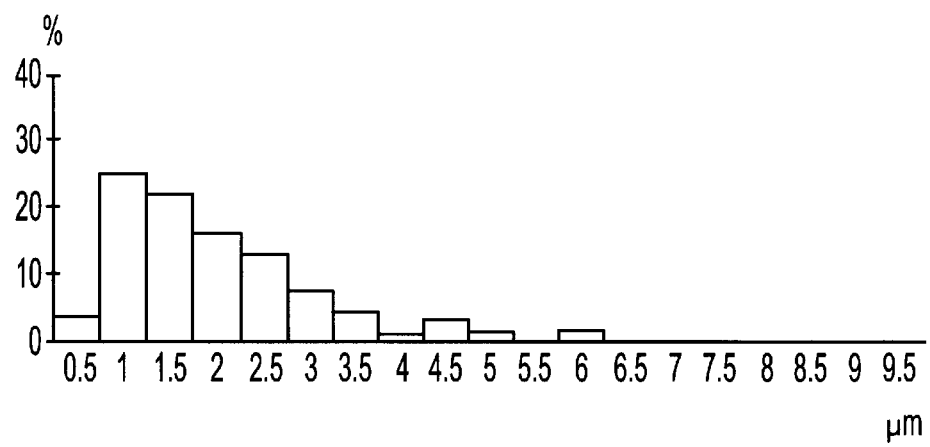

The procedure is as in Example 5, except that 0.8 g is introduced in place of the 0.4 g of Tempo. The properties of the composition thus obtained are shown in Table 1. The distribution of the sizes of the nodules (% by volume) is represented in FIG. 6.

EXAMPLE 7

Figure 7:
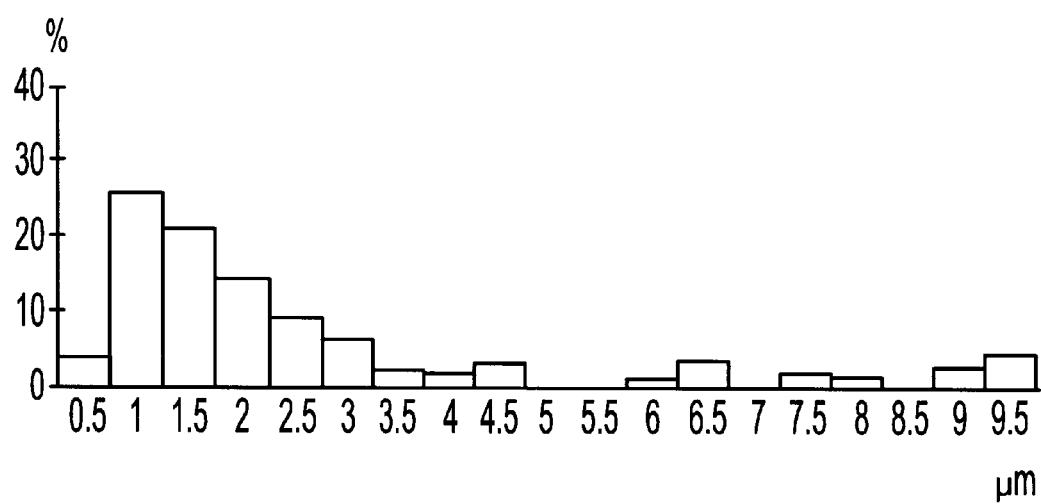

The procedure is as in Example 5, except that 1.2 g are introduced in place of the 0.4 g of Tempo. The properties of the composition thus obtained are shown in Table 1. The distribution of the sizes of the nodules (% by volume) is represented in FIG. 7.

TABLE 1

|  | UNIT | EXAMPLE 1 (comp.) | EXAMPLE 2 | EXAMPLE 3 | EXAMPLE 4 (comp.) | EXAMPLE 5 | EXAMPLE 6 | EXAMPLE 7 |
|---|---|---|---|---|---|---|---|---|
| Amount of Tempo in the polymerization with respect to the amount of styrene charged | ppm | 0 | 109 | 326 | 0 | 53 | 105 | 158 |
| Properties of the final composition |  |  |  |  |  |  |  |  |
| Level of polybutadiene | % by weight | 7.3 | 7.6 | 7.7 | 4.3 | 4.3 | 4.1 | 4.3 |
| Mean size of the nodules | mm | 1.07 | 1.46 | 3.8 | 0.84 | 1.07 | 1.27 | 1.37 |
| Distribution of the sizes of the nodules |  | Mono. | Bi. | Bi. | Mono. | Mono. | Mono. | Bi. |
| Mw |  | 261,000 | 215,000 | 151,000 | 230,000 | 211,500 | 203,000 | 197,000 |
| Mn |  | 110,000 | 87,000 | 73,000 | 89,000 | 82,000 | 81,000 | 79,500 |
| Mw/Mn |  | 2.4 | 2.4 | 2.1 | 2.6 | 2.6 | 2.5 | 2.5 |
| Melt index | g/10 min | 3.5 | 7 | 40 | 4.5 | 7.5 | 8.5 | 10.5 |
| Izod impact strength | kJ/m$^2$ | 50 | >70 | <10 | 31 | 48 | 61 | >70 |

I claim:

1. A process for the manufacture of a composition comprising a vinylaromatc polymer or copolymer matrix in which rubber nodules are dispersed, said process comprising a polymerization stage in the presence of at least one vinylaromatic monomer and at least one rubber during which a phase inversion takes place resulting in the formation of rubber nodules, said polymerization being thermally initiated or initiated by a polymerization initiator, characterized in that a stable free radical is present during the polymerization stage in a proportion of at least 10 ppm relative to the total vinylaromatic monomer and in that the distribution of the size of the nodules is widened in comparison to when no stable free radical is present.

2. The process according to claim 1, wherein the stable free radical is present in the polymerization mixture in the proportion of not more than 1000 ppm with respect to the vinylaromatic monomer.

3. The process according to claim 2, wherein the stable free radical is present in the polymerization mixture in the proportion of 10 to 250 ppm with respect to the vinylaromatic monomer.

4. The process according to claim 1, wherein the stable free radical comprises an =N—O. group.

5. The process according to claim 1, wherein the mixture of the polymerization stage comprises a polymerization initiator.

6. The process according to claim 1, wherein the mixture of the polymerization stage comprises per 100 parts by weight of the vinylaromatic monomer 2 to 35 parts by weight of the rubber, and 0 to 15 parts by weight of a solvent.

7. The process according to claim 6, wherein the solvent is ethylbenzene.

8. The process according to claim 5 wherein the amount of polymerization initiator is 50 to 2000 ppm with respect to the vinylaromatic monomer.

9. The process according to claim 8, wherein the polymerization stage is carried out between 50° C. and 200° C.

10. The process according to claim 9, wherein the polymerization stage is carried out between 90° C. and 160° C.

11. The process according to claim 1, wherein the polymerization stage is carried out in the absence of a polymerization initiator and between 100° C. and 200° C.

12. The process according to claim 11, wherein the polymerization stage is carried out between 110° C. and 160° C.

13. The process according to claim 1, wherein the rubber is a polybutadiene.

14. The process according to claim 1, wherein the vinylaromatic monomer is styrene.

15. The process according to claim 1, wherein the stable free radical is 2,2,6,6-tetramethyl-1-piperidinyloxy.

16. The process according to claim 1, wherein the vinylaromatic monomer is styrene, the rubber is a polybutadiene, the stable free radical is 2,2,6,6-tetramethyl-1-piperidinyloxy, and the polymerization stage is carried out between 110° C. and 160° C.

17. The process according to claim 1, wherein the composition contains between 2 and 25% rubber.

18. The process according to claim 1, wherein impact resistance of the composition is raised in comparison to when no stable free radical is present.

19. The process according to claim 1, wherein melt index of the composition increase in comparison to when no stable free radical is present.

20. The process according to claim 2, wherein the stable free radical comprises an =N—O. and a mixture of the polymerization stage comprises per 100 parts by weight of the vinylaromatic monomer 2 to 35 parts by weight of the rubber, and 0 to 15 parts by weight of a solvent, and the composition contains between 2 and 25% rubber.

21. The process according to claim 1, wherein the composition contains between 2 and 25% rubber, impact resistance of the composition is raised in comparison to when no stable free radical is present, and the melt index of the composition increase in comparison to when no stable free radical is present.

* * * * *